United States Patent

Gangloff

[11] Patent Number: 5,677,670
[45] Date of Patent: Oct. 14, 1997

[54] FLASHING BRAKE LIGHT APPARATUS

[76] Inventor: Rodney W. Gangloff, 740 Dewayne Dr., Florissant, Mo. 63031

[21] Appl. No.: 504,504

[22] Filed: Jul. 20, 1995

[51] Int. Cl.⁶ .................................................. B60Q 1/44
[52] U.S. Cl. .................. 340/479; 340/463; 340/467; 340/468; 200/61.45 R
[58] Field of Search .................. 340/467, 463, 340/464, 468, 479; 200/61.45 R, 61.53, 61.52

[56] References Cited

U.S. PATENT DOCUMENTS

| | | | |
|---|---|---|---|
| 3,089,129 | 5/1963 | Nassikas et al. | 340/467 |
| 3,460,089 | 8/1969 | Gregory | 340/475 |
| 3,601,564 | 8/1971 | Ellison | 340/467 |
| 4,751,493 | 6/1988 | Miller | 340/467 |
| 4,871,945 | 10/1989 | Smith et al. | 315/200 A |
| 4,983,952 | 1/1991 | Athalye | 340/467 |
| 5,089,805 | 2/1992 | Salsman | 340/467 |
| 5,150,098 | 9/1992 | Rakow | 340/464 |
| 5,172,095 | 12/1992 | Scott | 340/479 |
| 5,309,141 | 5/1994 | Mason et al. | 340/467 |
| 5,345,218 | 9/1994 | Woods et al. | 340/479 |

*Primary Examiner*—Donnie L. Crosland

[57] ABSTRACT

A flashing brake light apparatus includes a base assembly and a housing assembly attached to the base assembly. An illumination assembly is supported by the housing assembly and is located at the rear side of the housing assembly. An illumination flash signaller is in light-conductive communication with the illumination assembly. The flash signaller is visible from the front side of the housing assembly. An illumination control circuitry assembly, housed within the housing assembly, powers the illumination assembly. An adjustable inertia sensor assembly is partially housed within the housing assembly and partially extends outside the housing assembly. The inertia sensor assembly is used for adjusting a degree of inertia that activates the illumination control circuitry assembly for illuminating the illumination assembly. The base assembly includes an access aperture for receiving electrical wiring from an electrical power source. The inertia sensor assembly includes a wheel and axle assembly housed within the housing assembly. A mercury switch assembly is supported by the wheel and axle assembly and is electrically connected to the illumination control circuitry assembly. The housing assembly includes an inertia adjustment aperture, and a portion of the wheel and axle assembly projects out from the housing assembly through the inertia adjustment aperture.

9 Claims, 3 Drawing Sheets

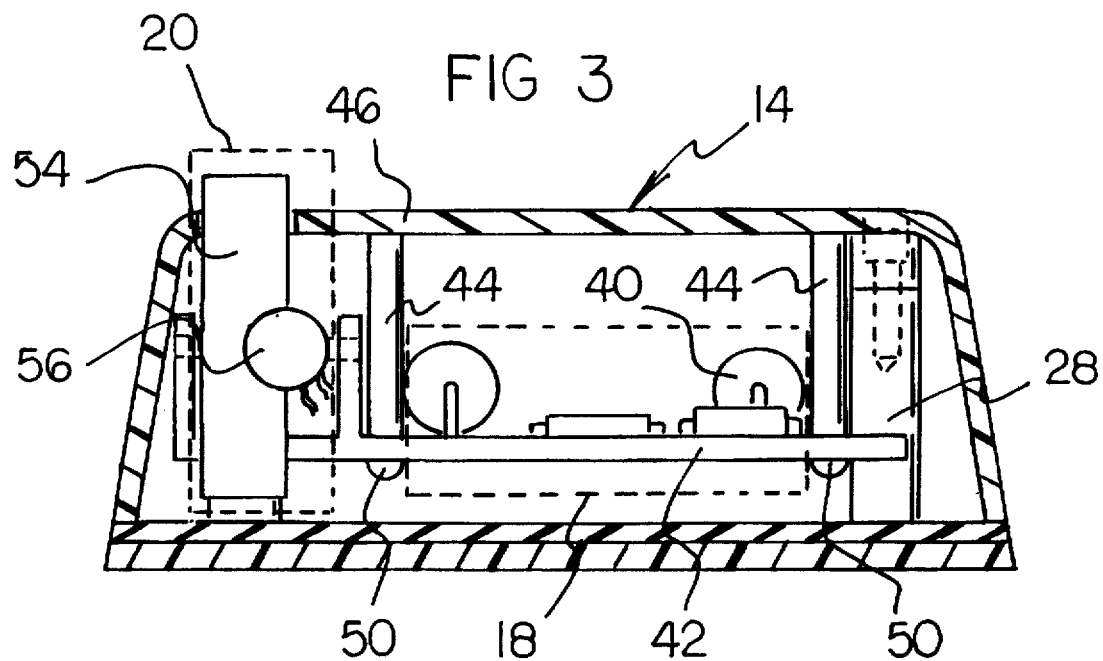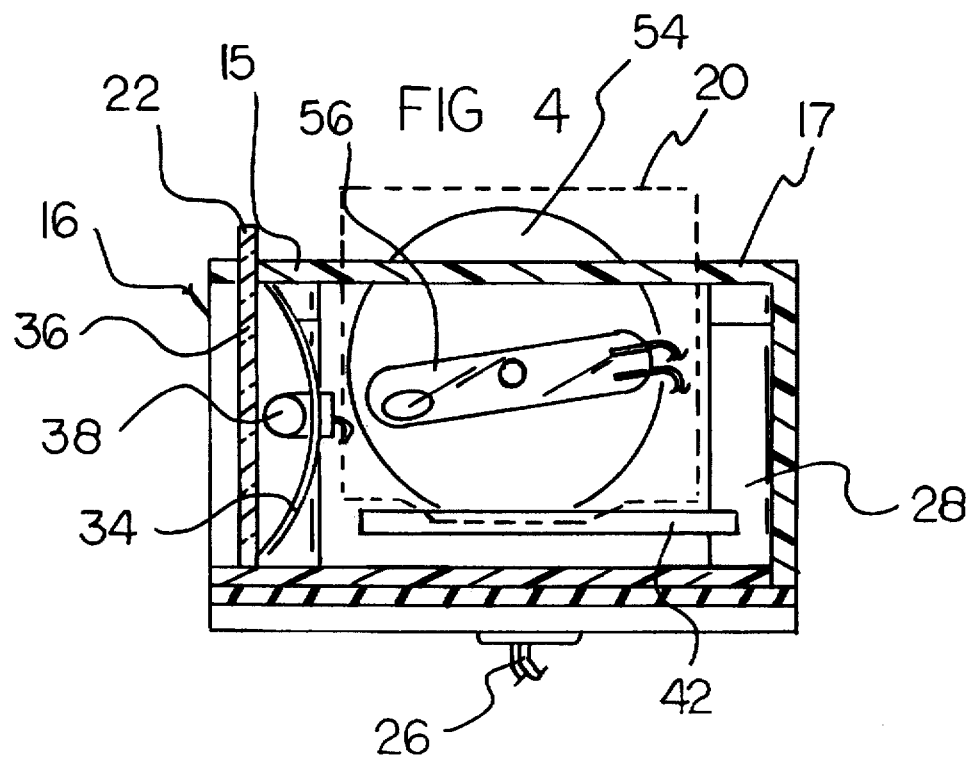

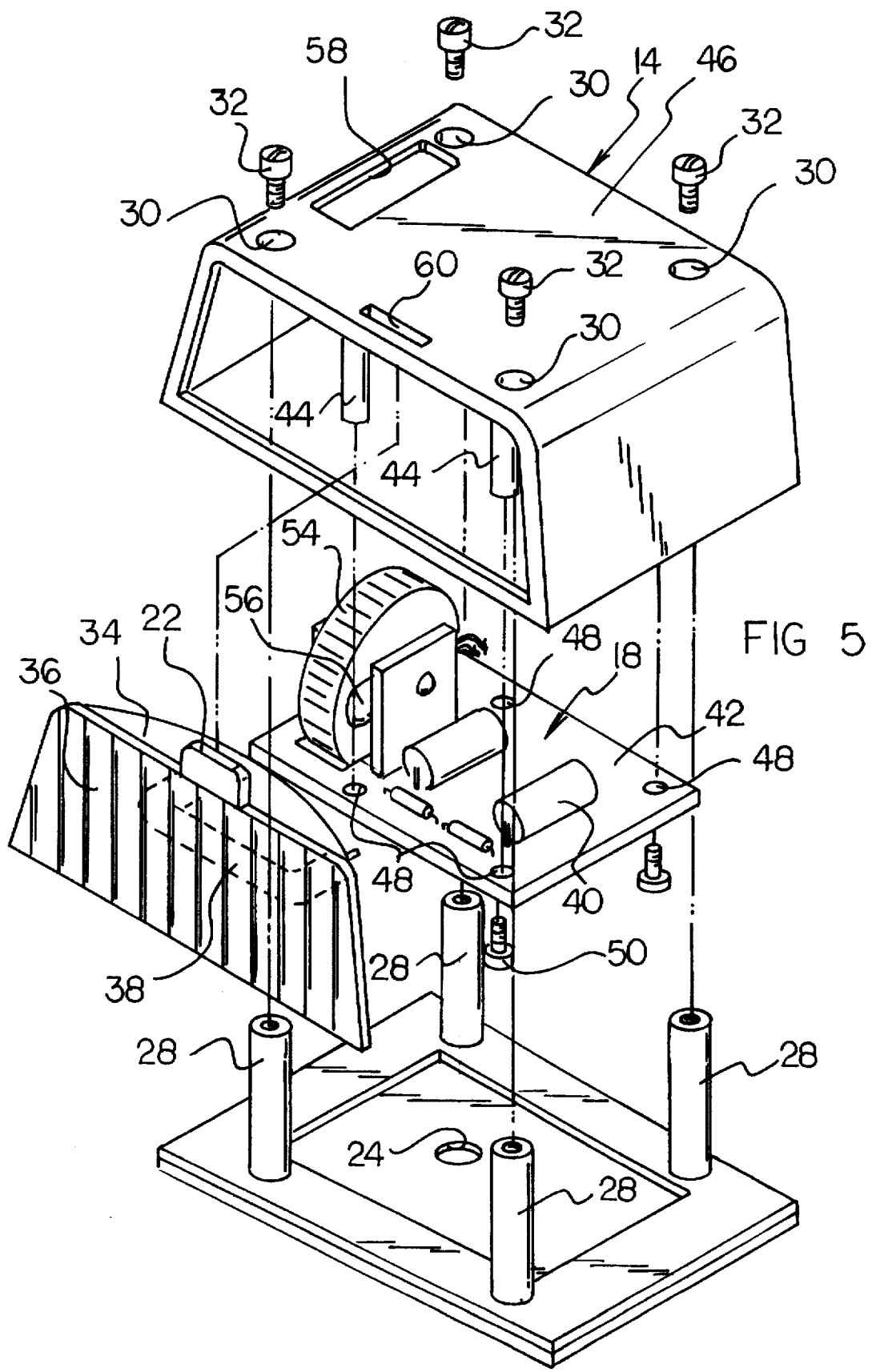

FLASHING BRAKE LIGHT APPARATUS

BACKGROUND OF THE INVENTION

1. Field of the Invention

The present invention relates generally to brake lights for motor vehicles and, more particularly, to a brake light especially adapted for use in emergency braking conditions.

2. Description of the Prior Art

When brakes of a motor vehicle are applied, lights at the rear of the vehicle will light up. Generally, such lights provide a steady illumination as long as the brakes are applied. It is understood that for many persons a flashing light attracts more attention than steady illumination. For this reason, throughout the years, a number of innovations have been developed relating to flashing brake lights, and the following U.S. patents are representative of some of those innovations: U.S. Pat. Nos. 4,871,945; 4,983,952; 5,150,098; 5,172,095; and 5,345,218.

More specifically, each of U.S. Pat. Nos. 4,983,952 and 5,150,098 discloses brake lights that flash when the brake pedal is pressed. For each of the two patents, the rate of light flashing is proportional to the foot-applied force applied to the brake pedal. To implement the devices disclosed in these two patents, it is necessary to provide a pressure transducer that is operated by the brake pedal. To install such a transducer may require working on the brake hydraulic lines. Or, to install such a transducer may require working on the brake pedal itself. Given the time and effort to install such devices, it would be desirable if a flashing brake light could be provided which does not require either working on brake hydraulic lines or working on the brake pedal itself for installation of the flashing light.

With respect to U.S. Pat. Nos. 4,871,945, 5,172,095, and 5,345,218, each of the devices disclosed in these patents relates to a flashing brake light that is activated each time the brake pedal is applied. The flashing of the brake light is not dependent upon whether an emergency braking situation occurs or not. In this respect, it would be desirable if a flashing brake light were provided which flashes only during emergency braking conditions.

Still other features would be desirable in a flashing brake light apparatus. Many motor vehicles have a brake light which is located in the passenger compartment near the rear window. For ease of installation of an auxiliary emergency brake light, it would be desirable if a flashing brake light could be installed next to the third brake light and derive electrical power from wiring that provides power to the third brake light.

Whenever a moving motor vehicle is decelerated, the inertia of the motor vehicle must be reduced. When the motor vehicle is decelerated, any person or object inside the passenger compartment of the motor vehicle must also decelerate. It is a well known phenomenon that passengers and other objects inside the passenger compartment sometimes fall forward when the rate of deceleration of the motor vehicle is high. During an emergency braking maneuver, the rate of deceleration of the motor vehicle is quite high. In this respect, it would be desirable if a flashing brake light were activated in response to a relatively high rate of deceleration that is present during an emergency braking situation.

For an emergency braking situation, most all drivers would respond in a similar way; that is, most drivers would slam on the brakes in an emergency. However, during non-emergency driving conditions, the braking habits among different drivers may differ quite a bit from one driver to another. Some drivers brake a motor vehicle very smoothly. Other drivers habitually brake in a rough or jerky manner. This being the case, it would be desirable if a flashing brake light apparatus could be individually calibrated for each driver's normal braking habits.

Many motor vehicles are used by different drivers at different times. Therefore, it would be desirable if a flashing brake light could be provided that is easily re-calibrated for each driver that drives the motor vehicle.

A brake light directs its illumination pattern toward the rear of the motor vehicle. Yet, the driver sits toward the front of the motor vehicle. To assist the driver is ascertaining the operability of the flashing brake light, it would be desirable if the flashing rate of the flashing brake light were visible to the driver of the motor vehicle.

Thus, while the foregoing body of prior art indicates it to be well known to use flashing brake lights, the prior art described above does not teach or suggest a flashing brake light apparatus which has the following combination of desirable features: (1) does not operate by connection to either brake hydraulic lines or the brake pedal; (2) flashes only during emergency braking conditions; (3) can be installed next to the third brake light inside the passenger compartment of the motor vehicle and can derive electrical power from wiring that provides power to the third brake light; (4) is activated in response to a relatively high rate of deceleration that is present during an emergency braking situation; (5) can be individually calibrated for each driver's normal braking habits; (6) is easily re-calibrated for each driver that drives the motor vehicle; and (7) permits the flashing rate of the flashing brake light to be easily visible to the driver of the motor vehicle. The foregoing desired characteristics are provided by the unique flashing brake light apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a flashing brake light apparatus which includes a base assembly and a housing assembly attached to the base assembly. The housing assembly has a rear side and a front side. An illumination assembly is supported by the housing assembly and is located at the rear side of the housing assembly. An illumination flash signaller is in light-conductive communication with the illumination assembly. The flash signaller is visible from the front side of the housing assembly. An illumination control circuitry assembly, housed within the housing assembly, is provided for powering the illumination assembly. An adjustable inertia sensor assembly is partially housed within the housing assembly and partially extends outside the housing assembly. The inertia sensor assembly is used for adjusting a degree of inertia that activates the illumination control circuitry assembly for illuminating the illumination assembly.

The base assembly includes an access aperture for receiving electrical wiring from an electrical power source. The base assembly includes a plurality of support columns. The housing assembly includes a plurality of connector apertures. The connector apertures are placed in registration with the support columns when the housing assembly is placed over the base assembly. A plurality of housing connectors are provided for placement through the connector apertures into the support columns for securing the housing assembly to the base assembly.

The illumination assembly includes a reflector. A lens is placed rearward of the reflector, and a lamp is placed between the reflector and the lens. The flash signaller is an extension of the lens which extends above the housing assembly. The housing assembly includes signaller slot, and the flash signaller projects through the signaller slot to outside of the housing assembly.

The illumination control circuitry assembly includes a plurality of electrical circuit components supported on a circuit board.

The housing assembly includes a plurality of suspension columns that extend downward from a top portion of the housing assembly toward the base assembly. The circuit board includes a plurality of connector apertures placed in registration with the suspension columns, and a plurality of circuit board connectors are provided for placement through the connector apertures into the suspension columns for securing the circuit board to the housing assembly and suspending the circuit board therefrom.

The inertia sensor assembly includes a wheel and axle assembly housed within the housing assembly. A mercury switch assembly is supported by the wheel and axle assembly and is electrically connected to the illumination control circuitry assembly. The housing assembly includes an inertia adjustment aperture, and a portion of the wheel and axle assembly projects out from the housing assembly through the inertia adjustment aperture.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved flashing brake light apparatus which has all of the advantages of the prior art and none of the disadvantages.

It is another object of the present invention to provide a new and improved flashing brake light apparatus which may be easily and efficiently manufactured and marketed.

It is a further object of the present invention to provide a new and improved flashing brake light apparatus which is of durable and reliable construction.

An even further object of the present invention is to provide a new and improved flashing brake light apparatus which is susceptible of a low cost of manufacture with regard to both materials and labor, and which accordingly is then susceptible of low prices of sale to the consuming public, thereby making such flashing brake light apparatus available to the buying public.

Still yet a further object of the present invention is to provide a new and improved flashing brake light apparatus which does not operate by connection to either brake hydraulic lines or the brake pedal.

Still another object of the present invention is to provide a new and improved flashing brake light apparatus that flashes only during emergency braking conditions.

Yet another object of the present invention is to provide a new and improved flashing brake light apparatus which can be installed next to the third brake light inside the passenger compartment of the motor vehicle and can derive electrical power from wiring that provides power to the third brake light.

Even another object of the present invention is to provide a new and improved flashing brake light apparatus that is activated in response to a relatively high rate of deceleration that is present during an emergency braking situation.

Still a further object of the present invention is to provide a new and improved flashing brake light apparatus which can be individually calibrated for each driver's normal braking habits.

Yet another object of the present invention is to provide a new and improved flashing brake light apparatus that is easily re-calibrated for each driver that drives the motor vehicle.

Still another object of the present invention is to provide a new and improved flashing brake light apparatus which permits the flashing rate of the flashing light to be easily visible to the driver of the motor vehicle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a cross-sectional view of the embodiment of the invention of FIG. 2 taken along line 3—3 thereof.

FIG. 4 is a cross-sectional view of the embodiment of the invention of FIG. 2 taken along line 4—4 thereof.

FIG. 5 is an exploded perspective view of the embodiment of the invention shown in FIG. 2.

DESCRIPTION OF THE PREFERRED EMBODIMENT

With reference to the drawings, a new and improved flashing brake light apparatus embodying the principles and concepts of the present invention will be described.

Figure 1:
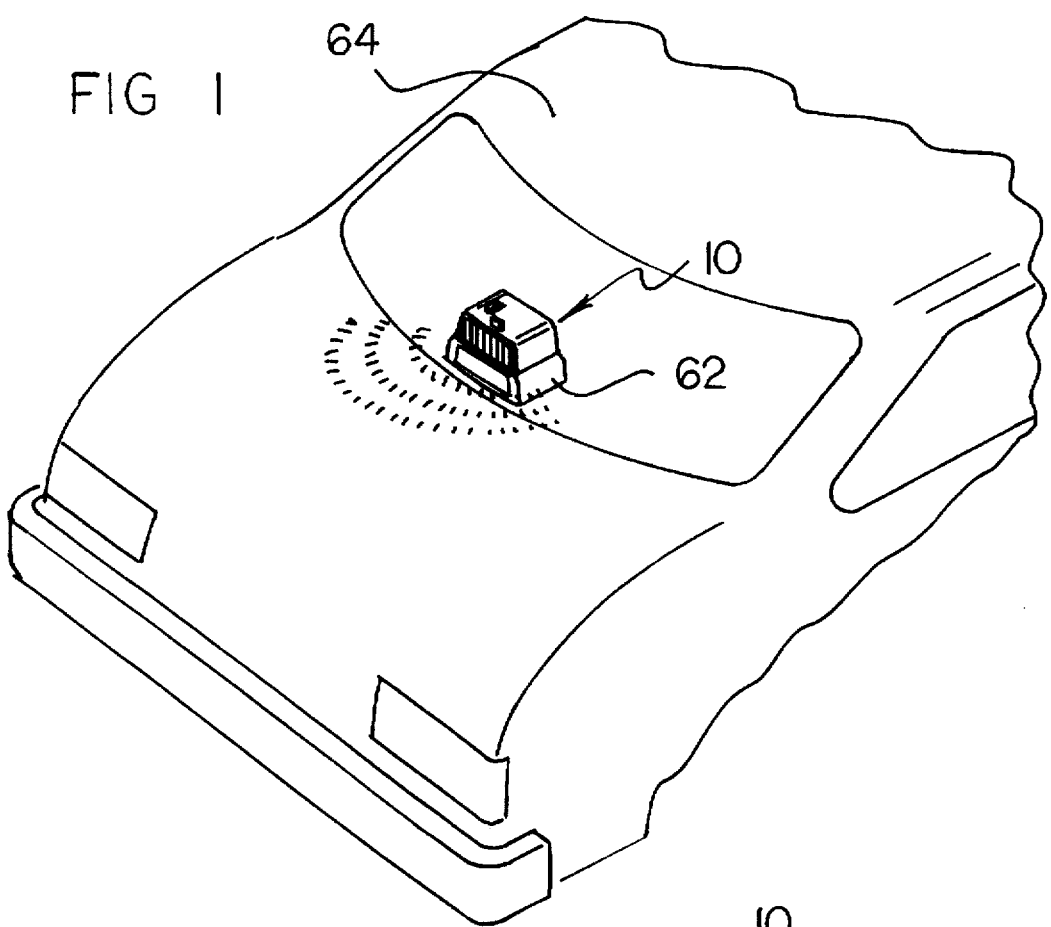
FIG. 1 is a perspective view showing a preferred embodiment of the flashing brake light apparatus of the invention installed on top of the third brake light near the rear window of a motor vehicle.
Figure 2:
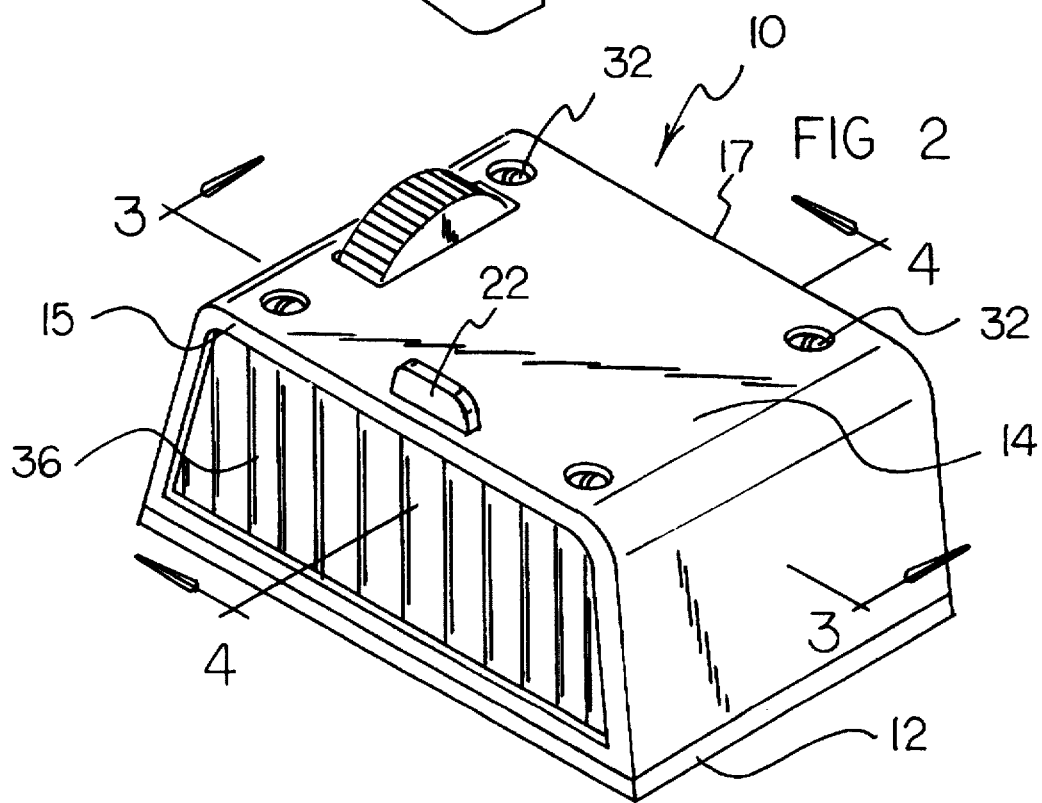
FIG. 2 is an enlarged perspective view of the embodiment of the flashing brake light apparatus shown in FIG. 1 removed from the motor vehicle.

Turning to FIGS. 1–5, there is shown an exemplary embodiment of the flashing brake light apparatus of the invention generally designated by reference numeral 10. In its preferred form, flashing brake light apparatus 10 includes a base assembly 12 and a housing assembly 14 attached to the base assembly 12. The housing assembly 14 has a rear side 15 and a front side 17. An illumination assembly 16 is supported by the housing assembly 14 and is located at the rear side 15 of the housing assembly 14. An illumination flash signaller 22 is in light-conductive communication with the illumination assembly 16. The flash signaller 22 is visible from the front side 17 of the housing assembly 14. An illumination control circuitry assembly 18, housed within the housing assembly 14, is provided for powering the illumination assembly 16. An adjustable inertia sensor assembly 20 is partially housed within the housing assembly 14 and partially extends outside the housing assembly 14. The inertia sensor assembly 20 is used for adjusting a degree of inertia that activates the illumination control circuitry assembly 18 for illuminating the illumination assembly 16.

The base assembly 12 includes an access aperture 24 for receiving electrical wiring 26 from an electrical power source. Either a constant source of electrical power can be provided to the illumination control circuitry assembly 18, or the illumination control circuitry assembly 18 can receive electrical power only when the third brake light 62 is illuminated. The base assembly 12 includes a plurality of support columns 2.8. The housing assembly 14 includes a plurality of connector apertures 30. The connector apertures 30 are placed in registration with the support columns 28 when the housing assembly 14 is placed over the base assembly 12. A plurality of housing connectors 32 are provided for placement through the connector apertures 30 into the support columns 28 for securing the housing assembly 14 to the base assembly 12.

The illumination assembly 16 includes a reflector 34. A lens 36 is placed rearward of the reflector 34, and a lamp 38 is placed between the reflector 34 and the lens 36. The flash signaller 22 is an extension of the lens 36 which extends above the housing assembly 14. The housing assembly 14 includes signaller slot 60, and the flash signaller 22 projects through the signaller slot 60 to outside of the housing assembly 14.

The illumination control circuitry assembly 18 includes a plurality of electrical circuit components 40 supported on a circuit board 42. The illumination control circuitry assembly 18 can be a standard, conventional circuit used for causing a lamp to flash. If desired, a strobe light circuitry can be employed.

The housing assembly 14 includes a plurality of suspension columns 44 that extend downward from a top portion 46 of the housing assembly 14 toward the base assembly 12. The circuit board 42 includes a plurality of connector apertures 48 placed in registration with the suspension columns 44, and a plurality of circuit board connectors 50 are provided for placement through the connector apertures 48 into the suspension columns 44 for securing the circuit board 42 to the housing assembly 14 and suspending the circuit board 42 therefrom.

The inertia sensor assembly 20 includes a wheel and axle assembly 54 housed within the housing assembly 14. A mercury switch assembly 56 is supported by the wheel and axle assembly 54 and is electrically connected to the illumination control circuitry assembly 18. The housing assembly 14 includes an inertia adjustment aperture 58, and a portion of the wheel and axle assembly 54 projects out from the housing assembly 14 through the inertia adjustment aperture 58.

In using the flashing brake light apparatus 10 of the invention, the bottom side of the housing assembly 14 is affixed to the top surface of the third brake light 62 in a motor vehicle 64. A suitable glue, double-sided tape, or adhesive can be used for affixing the housing assembly 14 to the third brake light 62. Electrical wiring 26 extends from the illumination control circuitry assembly 18 to an electrical power source present in the third brake light 62. The illumination assembly 16 of the flashing brake light apparatus 10 faces rearward.

To calibrate the flashing brake light apparatus 10, the wheel and axle assembly 54 is turned to orient the mercury switch assembly 56 attached thereto. Because a portion of the wheel and axle assembly 54 extends above the housing assembly 14, an operator can use a finger to rotate the wheel and axle assembly 54. Once an initial setting is provided for the mercury switch assembly 56, the driver can road test the motor vehicle 64. At a selected vehicle speed, the driver can slam on the brakes and look through a rear view mirror to look at the flash signaller 22 to see if it flashes during deceleration of the motor vehicle 64. When the illumination assembly 16 provides a flashing light, the flashing nature of the light is transmitted to the flash signaller 22 which is visible through the rear view mirror.

If the first calibration of the flashing light is not desirable to the driver, then the driver can turn the wheel and axle assembly 54 again to re-adjust the mercury switch assembly 56. Then, the driver can drive the car and slam on the brakes again to determine if the flashing light occurs with a desired degree of deceleration. This process can be repeated until the driver is satisfied that the flashing of the illumination assembly 16 occurs at a desired degree of deceleration.

If it is desired to service or replace the portions of the flashing brake light apparatus 10 that are contained within the housing assembly 14, the housing connectors 32 are removed, and the housing assembly 14 is lifted off of the support columns 28 to separate the housing assembly 14 from the base assembly 12. The circuit board 42 and the inertia sensor assembly 20 are carried by the housing assembly 14. If it is desired to separate the circuit board 42 and the inertia sensor assembly 20 from the housing assembly 14, the circuit board connectors 50 are removed from the suspension columns 44.

The lamp 38 in the illumination assembly 16 can be replaced when the housing assembly 14 is removed from the base assembly 12. When the housing assembly 14 is removed from the base assembly 12, the signaller slot 60 is lifted off of the flash signaller 22, and the lens 36 can be removed from the illumination assembly 16 giving access to the lamp 38.

The illumination control circuitry assembly 18 is a standard, conventional circuit used for causing a lamp to flash. The mercury switch assembly 56 serves to make or break the flasher circuit. If desired, a layer of foam material can be placed between the base assembly 12 and the top of a third brake light 62 or between the inertia sensor assembly 20 and the circuit board 42 and the bottom of the housing assembly 14.

The components of the flashing brake light apparatus of the invention can be made from inexpensive and durable metal and plastic materials and conventional electrical and electronic components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved flashing brake light apparatus that is low in cost, relatively simple in design and operation, and which may advantageously be used without connection to either brake hydraulic lines or the brake pedal. With the invention, a flashing brake light apparatus is provided which flashes only during emergency braking conditions. With the invention, a flashing brake light apparatus is provided which can be installed next to the third brake light inside the passenger compartment of the motor vehicle and can derive electrical power from wiring that provides power to the third brake light. With the invention, a flashing brake light apparatus is provided which is activated in response to a relatively high rate of deceleration that is present during an emergency braking situation. With the invention, a flashing brake light apparatus is provided which can be individually calibrated for each driver's normal braking habits. With the invention, a flashing brake light apparatus is provided which is easily re-calibrated for each driver that drives the motor vehicle. With the invention, a flashing brake light apparatus is provided which permits the flashing rate of the flashing light to be easily visible to the driver of the motor vehicle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A flashing brake light apparatus, comprising:
   a base assembly,
   a housing assembly attached to said base assembly, wherein said housing assembly has a rear side and a front side,
   an illumination assembly supported by said housing assembly and located at said rear side of said housing assembly,
   an illumination flash signaller in light-conductive communication with said illumination assembly, wherein said flash signaller is visible from said front side of said housing assembly,
   an illumination control circuitry assembly, housed within said housing assembly, for powering said illumination assembly, and
   an adjustable inertia sensor assembly partially housed within said housing assembly and partially extending outside said housing assembly, wherein said inertia sensor assembly is used for adjusting a degree of inertia that activates said illumination control circuitry assembly for illuminating said illumination assembly, wherein:
   said base assembly includes a plurality of support columns,
   said housing assembly includes a plurality of connector apertures, wherein said connector apertures are placed in registration with said support columns when said housing assembly is placed over said base assembly, and
   a plurality of housing connectors for placement through said connector apertures into said support columns for securing said housing assembly to said base assembly.

2. The apparatus of claim 1 wherein said base assembly includes an access aperture for receiving electrical wiring from an electrical power source.

3. The apparatus of claim 1 wherein said illumination control circuitry assembly includes a plurality of electrical circuit components supported on a circuit board.

4. The apparatus of claim 1 wherein said illumination assembly includes:
   a reflector,
   a lens placed rearward of said reflector, and
   a lamp placed between said reflector and said lens.

5. The apparatus of claim 4 wherein said flash signaller is an extension of said lens which extends above said housing assembly.

6. The apparatus of claim 5 wherein said housing assembly includes signaller slot and said flash signaller projects through said signaller slot to outside of said housing assembly.

7. The apparatus of claim 1 wherein said inertia sensor assembly includes:
   a wheel and axle assembly housed within said housing assembly, and
   a mercury switch assembly supported by said wheel and axle assembly and electrically connected to said illumination control circuitry assembly.

8. The apparatus of claim 7 wherein:
   said housing assembly includes an inertia adjustment aperture, and
   a portion of said wheel and axle assembly projects out from said housing assembly through said inertia adjustment aperture.

9. A flashing brake light apparatus, comprising:
   a base assembly,
   a housing assembly attached to said base assembly, wherein said housing assembly has a rear side and a front side,
   an illumination assembly supported by said housing assembly and located at said rear side of said housing assembly,
   an illumination flash signaller in light-conductive communication with said illumination assembly, wherein said flash signaller is visible from said front side of said housing assembly,
   an illumination control circuitry assembly, housed within said housing assembly, for powering said illumination assembly, and an adjustable inertia sensor assembly partially housed within said housing assembly and partially extending outside said housing assembly, wherein said inertia sensor assembly is used for adjusting a degree of inertia that activates said illumination control circuitry assembly for illuminating said illumination assembly, wherein said illumination control circuitry assembly includes a plurality of electrical circuit components supported on a circuit board, wherein:

said housing assembly includes a plurality of suspension columns that extend downward from a top portion of said housing assembly toward said base assembly, said circuit board includes a plurality of connector apertures placed in registration with said suspension columns, and a plurality of circuit board connectors for placement through said connector apertures into said suspension columns for securing said circuit board to said housing assembly.

* * * * *